(12) United States Patent
Kowalewski (10) Patent No.: US 8,700,707 B2
(45) Date of Patent: Apr. 15, 2014

(54) COMMUNICATION DEVICES AND METHODS FOR CONTROLLING A COMMUNICATION DEVICE

(75) Inventor: Frank Kowalewski, Goettingen (DE)

(73) Assignee: Intel Mobile Communications GmbH, Neubiberg (DE)

(*) Notice: Subject to any disclaimer, the term of this patent is extended or adjusted under 35 U.S.C. 154(b) by 143 days.

(21) Appl. No.: 13/087,535

(22) Filed: Apr. 15, 2011

(65) Prior Publication Data

US 2012/0265807 A1 Oct. 18, 2012

(51) Int. Cl.
*G06F 15/16* (2006.01)

(52) U.S. Cl.
USPC .................................. 709/204; 709/248

(58) Field of Classification Search
USPC ........................ 709/204, 248, 200
See application file for complete search history.

(56) References Cited

U.S. PATENT DOCUMENTS

| 7,191,354 | B2* | 3/2007 | Purho ........................... 713/400 |
| 2010/0027426 | A1* | 2/2010 | Nair et al. .................. 370/238 |

FOREIGN PATENT DOCUMENTS

JP 2007208345 A 8/2007

OTHER PUBLICATIONS

"Lip Synchronization in Video Conferencing", Chapter 7 http://ptgmedia.pearsoncmg.com/images/9781587052682/samplechapter/1587052687_CH07.pdf pp. 223-255.
Rowan De Pomerai "Managing Audio Delays and Lip-Sync for HDTV" EBU Technical Review—2009 Q1 http://tech.ebu.ch/docs/techreview/trev_2009-Q1_HD-Audio-Delays.pdf, pp. 1-9.
H. Schulzrinne et al. IETF Request for Comments RFC3550 "RTP: A Transport Protocol for Real-Time Applications" Network Working Group, Jul. 2003 http://tools.ietf.org/html/rfc3550, pp. 1-89.
Network Time Protocol from Wikipedia, the free encyclopedia http://en.wikipedia.org/wiki/Network_Time_Protocol, pp. 1-6.
3GPP Technical Specification TS24.229, V10.0.0 (Jun. 2010), 3rd Generation Partnership Project; Technical Specification Group Core Network and Terminals; "IP multimedia call control protocol based on Session Initiation Protocol (SIP) and Session Description Protocol (SDP); Stage 3" (Release 10), pp. 1-668.
J. Rosenberg et al. IETF Request for Comments RFC3261 "SIP: Session Initiation Protocol" Network Working Group, Jun. 2002 http://www.ietf.org/rfc/rfc3261.txt, pp. 1-270.
3GPP Technical Specification TS24.237, V9.1.0 (Dec. 2009) 3rd Gerneration Partnership Project; Technical Specification Group Core Network and Terminals; "IP Multimedia (IM) Core Network (CN) subsystem IP Multimedia Subsystem (IMS) Service Continuity; Stage 3" (Release 9), pp. 1-176.
IETF Request for Comments RFC791 Information Sciences Institute University of Southern California "Internet Protocol DARPA Internet Program Protocol Specification" Sep. 1981 http://tools.ietf.org/html/rfc791, pp. 1-52.
English language abstract of JP 2007-208345 A.

* cited by examiner

Primary Examiner — El Hadji Sall (57) ABSTRACT

In an embodiment, a communication device may be provided. The communication device may include a first communication interface configured to receive a first data portion from a corresponding communication device. The communication device may further include a second communication interface configured to receive data from a further communication device. The further communication device may receive a second data portion from the corresponding communication device. The first data portion and the second data portion may be useful data for a user of the communication device. The communication device may further include a synchronizer configured to synchronize the first data portion with the second data portion based on the data received from the other communication device via the second communication interface.

21 Claims, 6 Drawing Sheets

COMMUNICATION DEVICES AND METHODS FOR CONTROLLING A COMMUNICATION DEVICE

TECHNICAL FIELD

Embodiments relate generally to communication devices and methods for controlling a communication device.

BACKGROUND

Collaborative communications sessions may be held in various kinds of networks. A collaborative session may be a peer's communications session that may include multiple communication devices. In other words the communication peer may be using multiple communication devices to communicate with other peers. Data to be presented to the user may be presented using different devices of the user, for example, video data may be displayed on one device of the user, and audio data related to the video may be played back by another device of the user.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A communication device according to various embodiments may be a device configured for wired communication, for example a desktop computer or laptop, or for wireless communication, for example a radio communication device. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The communication device may include a memory which may for example be used in the processing carried out by the communication device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific communication device may also hold for any communication device described herein. It will be understood that any property described herein for a specific method may also hold for any method described herein.

Figure 1:
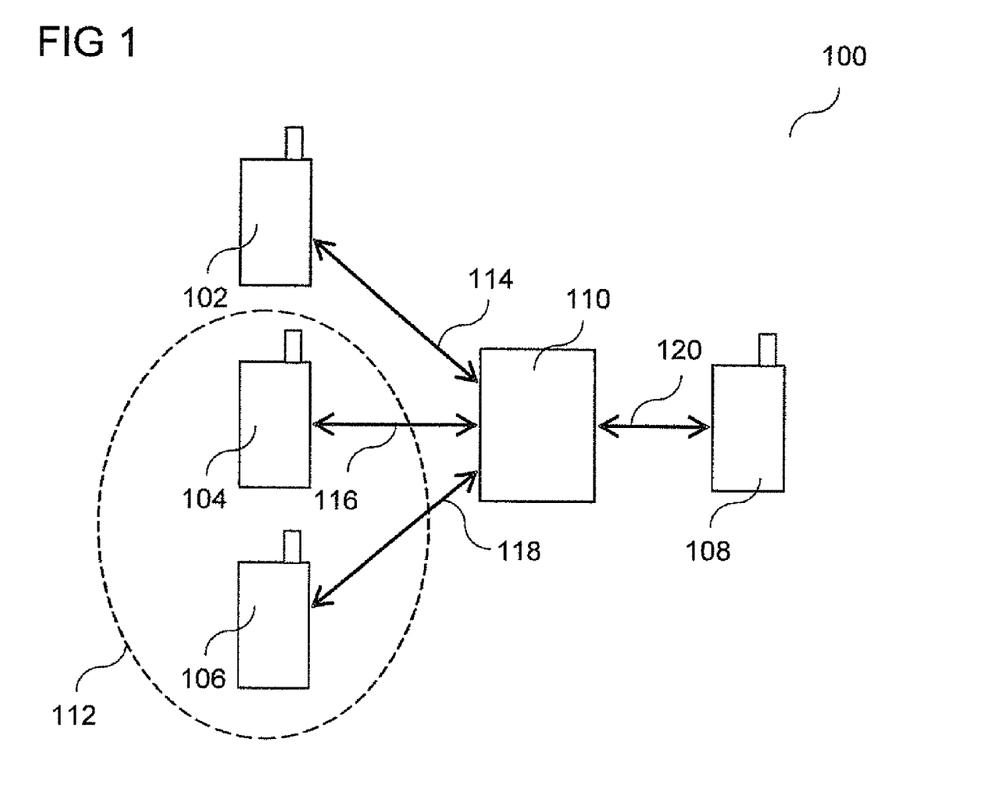
FIG. 1 shows various communication devices in accordance with an embodiment.

FIG. 1 shows various communication devices in accordance with an embodiment. In the arrangement 100, which may provide a collaborative communications session, a first communication device 102 (which may also be referred to as T1), a second communication device 104 (which may also be referred to as T2), a third communication device 106 (which may also be referred to as T3), a fourth communication device 108 (which may also be referred to as T4), and a call managing server 110 (which may also be referred to as S) may be provided. Each of the communication devices may belong to a user, and a user may have more than one communication device. For example, the first communication device 102 may belong to a first user (who may also be referred to as U1). The second communication device 104 and the third communication device 106 may belong to a second user (who may also be referred to as U2), like indicated by dashed ellipse 112. The fourth communication device 108 may belong to a third user (who may also be referred to as U3). The first communication device 102 may communicate with the call managing server 110, for example via a wired connection or a wireless connection, like indicated by a first arrow 114. The second communication device 104 may communicate with the call managing server 110, for example via a wired connection or a wireless connection, like indicated by a second arrow 116. The third communication device 106 may communicate with the call managing server 110, for example via a wired connection or a wireless connection, like indicated by a third arrow 118. The fourth communication device 108 may communicate with the call managing server 110, for example via a wired connection or a wireless connection, like indicated by a fourth arrow 120.

Collaborative communications sessions may be held in various kinds of networks. A collaborative session may be a peer's communications session that may include multiple communication devices. In other words the communication peer may be using multiple communication devices to communicate with other peers. Data to be presented to the user may be presented using different devices of the user, for example, video data may be displayed on one device of the user, and audio data related to the video may be played back by another device of the user.

It will be understood that video data may include visual information, and audio data related to the video data may include acoustic information related to the visual information. For example, a movie may include both video data and audio data.

According to various embodiments, devices and methods may be provided for transmission of multimedia streams. Different multimedia streams of a single source (for example audio and video of the same source) may be transmitted to separate devices. According to various embodiments, the transmission delays for the separate devices may be different so that media generated at the same time instant may be received and presented at different times by the devices. According to various embodiments, media presentation by the separate devices may be synchronized, for example it may be ensured that media portions captured at the same time instant also are presented at the same time instant. According to various embodiments, synchronization may not need any human assistance.

Media streams may be synchronized by sending media generated at the same time instance simultaneously. For this method it may be assumed that the transmission delays and the processing delays (for decoding by the receivers) are the same for all media.

Media to be synchronously presented may be transmitted via different paths (e.g. using different IP (Internet protocol) hops or using different transmission technologies). This may result in different transmission delays for the media.

Decoding by presentation devices may take different processing times (for example video decoding may take longer than audio decoding). This may result in different processing delays for different media.

Different transmission and/or processing delays may be compensated by pre-determined intended additional media delays. The intended delays may be performed by media sending devices or by the presentation devices.

Delay compensation may be controlled by hand by the user. For example set top boxes may allow to compensate different media delays by hand.

Presentation devices may estimate their media processing delays. The estimated processing delays may be used to delay media presentations in order to compensate desynchronization due to processing delays (for example due to decoding delays).

In order to compensate differences in media transmission delays, media sources may include time stamps in media streams. Presentation devices may be synchronized to a common wall clock. From media reception times with respect to the common wall clock time and from the included source time stamps synchronization, offset times may be calculated. Media may be delayed according to the calculated offset times.

Included time stamps may be digital time stamps. For example NTP (Network Time Protocol) time stamps may be included in RTP (Real-time Transport Protocol) and RTCP (RTP Control Protocol) headers.

Time stamps may be analog time stamps included in the media signals. For example water marks may be added to audio or video signals.

In many cases, synchronization of presentation devices to a common wall clock may be done by NTP synchronization via the internet. In this method, the devices may be synchronized via a hierarchy of synchronization servers.

Communication devices may include Bluetooth connectivity allowing to set up direct short range connections between the devices.

When synchronizing media by simultaneous transmission of the media, the media may not be correctly synchronized if media transmission delays and/or processing delays for the media are different.

When synchronizing media by hand, synchronization may be difficult to perform, inaccurate and a burden to the user.

When synchronizing media based on NTP time synchronization via the internet, time synchronization may be inaccurate.

According to various embodiments, devices and methods may be provided for lip synchronization, for example automatic lip synchronization, and for time synchronization.

According to various embodiments, timing offset between devices may be measured using a direct connection. According to various embodiments, timing offset between devices may be measured using Bluetooth. According to various embodiments, timing offset between devices may be measured using a local breakout connection. According to various embodiments, timing offset between devices may be measured using strict source routing.

According to various embodiments, a Bluetooth pairing code derived from call ID (identifier) may be used. According to various embodiments, a Bluetooth pairing code derived from a RTP (Real-time Transport Protocol) CNAME (canonical name) may be used.

According to various embodiments, accurate timing offset measurement and fast timing offset measurement may be provided. According to various embodiments, no human assistance may be needed.

Figure 2:
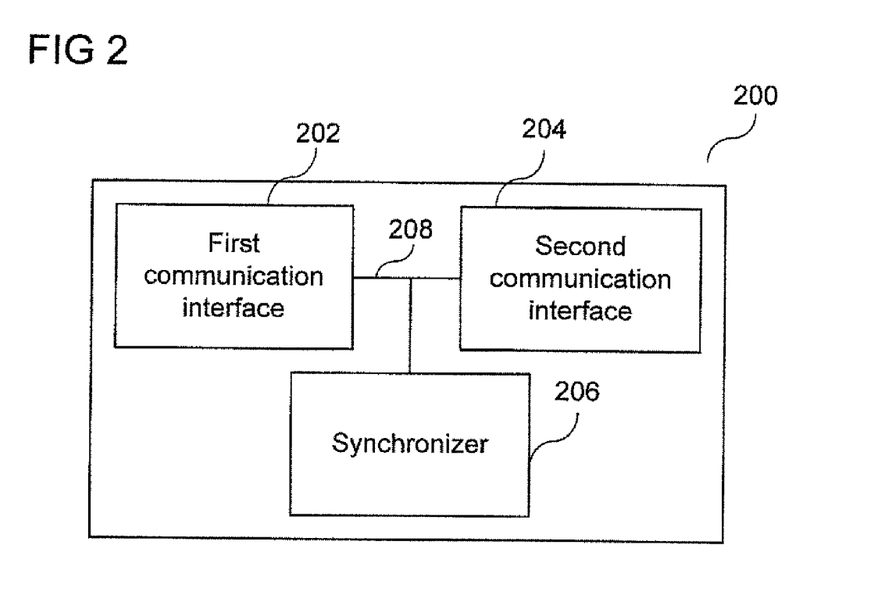
FIG. 2 shows a communication device in accordance with an embodiment.

FIG. 2 shows a communication device 200 in accordance with an embodiment. The communication device 200 may include a first communication interface 202 configured to receive a first data portion from a corresponding communication device (not shown in FIG. 2). The communication device 200 may further include a second communication interface 204 configured to receive data from a further communication device (not shown in FIG. 2). The further communication device may receive a second data portion from the corresponding communication device. The first data portion and the second data portion may be useful data for a user of the communication device 200. The communication device 200 may further include a synchronizer 206 configured to synchronize the first data portion with the second data portion based on the data received from the other communication device via the second communication interface 204. The first communication interface 202, the second communication interface 204, and the synchronizer 206 may be coupled with each other, e.g. via an electrical connection 208 such as e.g. a cable or a computer bus or via any other suitable electrical connection to exchange electrical signals.

According to various embodiments, the first communication interface 202 may be configured to receive the first data portion from the corresponding communication device in a collaborative communications session. According to various embodiments, the further communication device may be configured to receive the second data portion from the corresponding communication device in the collaborative communications session.

According to various embodiments, the communication device and the further communication device may be in communication with a sender of media (for example the corresponding communication device), and a peer, for example a user of the communication device, may be using different devices for presentation of different media, for example the communication device for presentation of a first medium, which may be represented by the first data portion, and the further communication device for presentation of a second medium, which may be represented by the second data portion.

According to various embodiments, the first communication interface 202 may be provided as a first communication interface circuit. According to various embodiments, the second communication interface 204 may be provided as a second communication interface circuit. According to various embodiments, the synchronizer may be provided as a synchronizing circuit.

According to various embodiments, the first communication interface 202 may be configured according to a cellular mobile radio communication access technology.

According to various embodiments, the first communication interface 202 may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

According to various embodiments, the second communication interface 204 may be configured for direct communication with the further communication device.

According to various embodiments, the second communication interface 204 may be configured according to a short range wireless radio communication access technology. According to various embodiments, the second communication interface 204 may be configured according to at least one of the following radio access technologies: a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard), IrDA (Infrared Data Association), Z-Wave and ZigBee, HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

According to various embodiments, the second communication interface 204 may be configured for a symmetric communication with the further communication device.

According to various embodiments, the second communication interface 204 may be configured for a local breakout connection with the further communication device.

According to various embodiments, the second communication interface 204 may be configured for connection with the further communication device using strict source routing.

According to various embodiments, the second communication interface may be configured to communicate with the further communication device using a home NodeB.

A 'Home NodeB' (HNB) or 'Home eNodeB' (HeNB) may be understood in accordance with 3GPP as a trimmed-down version of a base station optimized for use in residential or corporate environments (e.g. private homes, public restaurants or small office areas).

So-called 'Home Base Stations' or 'Femto-Cells' may be designed to be installed by the customer himself within his premises e.g., in a 'plug-and-play' manner. As the 'Femto Cell' box may be physically solely under the control of the customer, it may be moved around and even carried to locations different from the customer's house.

Figure 3:
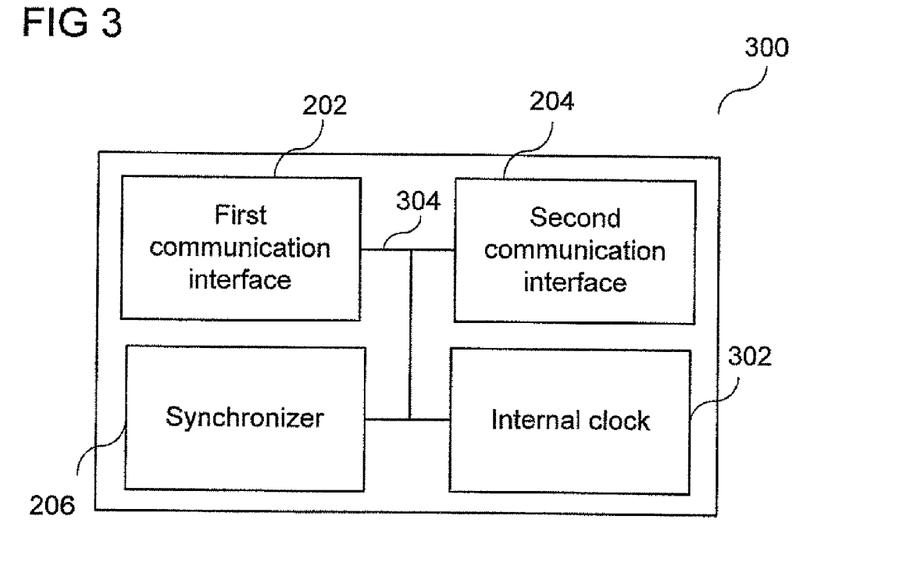
FIG. 3 shows a communication device in accordance with an embodiment.

FIG. 3 shows a communication device 300 in accordance with an embodiment. The communication device 300 may, similar to the communication device 200 shown in FIG. 2, include a first communication interface 202. The communication device 300 may, similar to the communication device 200 shown in FIG. 2, include a second communication interface 204. The communication device 300 may, similar to the communication device 200 shown in FIG. 2, include a synchronizer 206. The communication device 300 may further include an internal clock 302. The first communication interface 202, the second communication interface 204, the synchronizer 206, and the internal clock 302 may be coupled with each other, e.g. via an electrical connection 304 such as e.g. a cable or a computer bus or via any other suitable electrical connection to exchange electrical signals.

According to various embodiments, the internal clock 302 may be provided as an internal clock circuit.

According to various embodiments, the second communication interface 204 may be configured to send first timing information including a send time (for example $t_{2s}$ like will be described below) of the first timing information according to the internal clock 302 of the communication device 300 to the further communication device.

According to various embodiments, the second communication interface 204 may be further configured to receive a receive time (for example $t_{3r}$ like will be described below) of the first timing information according to an internal clock of the further communication device.

According to various embodiments, the second communication interface 204 may further be configured to receive a second timing information including a send time (for example $t_{3s}$ like will be described below) of the second timing information according to an internal clock of the further communication device from the further communication device.

According to various embodiments, the second communication interface 204 may further be configured to send a receive time (for example $t_{2r}$ like will be described below) of the second timing information according to the internal clock 302 of the communication device 300.

According to various embodiments, the second communication interface 204 may further be configured to send to the further communication device a first presenting time information including information indicating a time (for example $t_{2p}$ like will be described below) when the communication device 300 may reproduce (in other words: may present, may display, or may play back) the first data portion.

According to various embodiments, the first presenting time may be based on a reception time of the first data portion.

According to various embodiments, the second communication interface 204 may further be configured to receive from the further communication device a second presenting time information including information indicating a time (for example $t_{3p}$ like will be described below) when the further communication device may reproduce the second data portion.

According to various embodiments, the synchronizer 206 may further be configured to synchronize the internal clock 302 of the communication device 300 with an internal clock of the further communication device.

According to various embodiments, the communication device 300 may further include a data reproducer (not shown) configured to reproduce the first data portion.

According to various embodiments, the data reproducer may be provided as a data reproducing circuit.

According to various embodiments, the data reproducer may be configured to reproduce (in other words: present; display; play back; show to the user) the first data portion based on the synchronization of the first data portion with the second data portion. According to various embodiments, reproduction of the first data portion may be delayed by a pre-determined amount of delay, wherein the pre-determined amount of delay may be determined based on the synchronization of the first data portion with the second data portion.

According to various embodiments, the first data portion may include a time stamp indicating a time on which the first data portion has been generated.

According to various embodiments, the data reproducer may be configured to reproduce the first data portion based on the timestamp of the first data portion.

According to various embodiments, the first data portion may include or may be at least one of audio data and image data and video data and text data.

According to various embodiments, the second data portion may include or may be at least one of audio data and image data and video data and text data.

According to various embodiments, the first data portion may include or may be video data, and the second data portion may include or may be audio data related to the video data.

According to various embodiments, the second data portion may include or may be video data, and the first data portion may include or may be audio data related to the video data.

According to various embodiments, at least one further data portion (for example a third data portion) may be provided, and synchronization may be provided between the first data portion, the second data portion, and the third data portion. For example, the third data portion may include subtitle information related to the audio data of the second data portion, or may include another audio data, for example in a different language.

According to various embodiments, the further communication device may be configured similar or identical to the communication device 200 of FIG. 2 or to the communication device 300 of FIG. 3.

Figure 4:
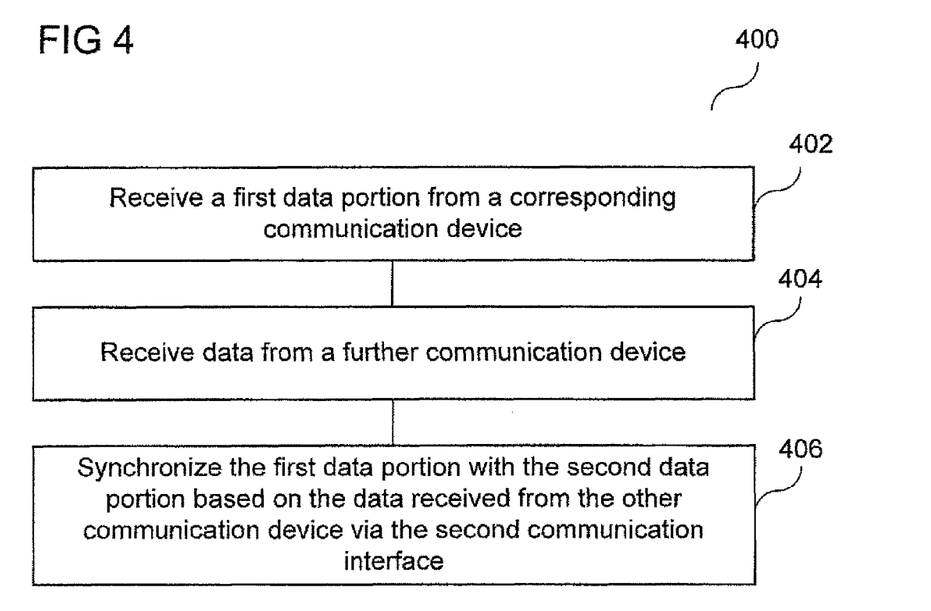
FIG. 4 shows a flow diagram illustrating a method for controlling a communication device in accordance with an embodiment.

FIG. 4 shows a flow diagram 400 illustrating a method for controlling a communication device in accordance with an embodiment. In 402, a first data portion may be received from a corresponding communication device. In 404, data may be received from a further communication device. The further communication device may receive a second data portion from the corresponding communication device. The first data portion and the second data portion may be useful data for a user of the communication device. In 406, the first data portion may be synchronized with the second data portion based on the data received from the other communication device via the second communication interface.

According to various embodiments, the first data portion may be received from the corresponding communication device in a collaborative communications session. According to various embodiments, the further communication device may receive the second data portion from the corresponding communication device in the collaborative communications session.

According to various embodiments, the communication device and the further communication device may be in communication with a sender of media (for example the corresponding communication device), and a peer, for example a user of the communication device, may be using different devices for presentation of different media, for example the communication device for a presentation of a first medium, which may be represented by the first data portion, and the further communication device for presentation of a second medium, which may be represented by the second data portion.

According to various embodiments, the first data portion may be received using a cellular mobile radio communication access technology.

According to various embodiments, the first data portion may be received using at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

According to various embodiments, the data may be received from the further communication device using a direct communication.

According to various embodiments, the data may be received from the further communication device using a short range wireless radio communication access technology. According to various embodiments, the data may be received from the further communication device using at least one of the following radio access technologies: a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard), IrDA (Infrared Data Association), Z-Wave and ZigBee, HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

According to various embodiments, the data may be received from the further communication device via a symmetric connection from the further communication device.

According to various embodiments, the data may be received from the further communication device via a local breakout connection.

According to various embodiments, the data may be received from the further communication device using strict source routing.

According to various embodiments, the data may be received from the further communication device via a home NodeB.

According to various embodiments, a time may be determined according to an internal clock.

According to various embodiments, first timing information including a send time (for example $t_{2s}$ like will be described below) of the first timing information according to the internal clock of the communication device may be sent to the further communication device.

According to various embodiments, a receive time (for example $t_{3r}$ like will be described below) of the first timing information according to an internal clock of the further communication device may be received.

According to various embodiments, a second timing information including a send time (for example $t_{3s}$ like will be described below) of the second timing information according to an internal clock of the further communication device may be received from the further communication device.

According to various embodiments, a receive time (for example $t_{2r}$ like will be described below) of the second timing information according to the internal clock of the communication device may be sent.

According to various embodiments, a first presenting time information including information indicating a time (for example $t_{2p}$ like will be described below) when the communication device may reproduce the first data portion may be sent.

According to various embodiments, the first presenting time may be based on a reception time of the first data portion.

According to various embodiments, a second presenting time information including information indicating a time (for example $t_{3p}$ like will be described below) when the further communication device may reproduce the second data portion may be received from the further communication device.

According to various embodiments, the internal clock of the communication device may be synchronized with an internal clock of the further communication device.

According to various embodiments, the first data portion may be reproduced (in other words: may be presented (in other words: shown, displayed, played-back) to the user of the communication device).

According to various embodiments, the first data portion may be reproduced based on the synchronization of the first data portion with the second data portion. According to various embodiments, reproduction of the first data portion may be delayed by a pre-determined amount of delay, wherein the pre-determined amount of delay may be determined based on the synchronization of the first data portion with the second data portion.

According to various embodiments, the first data portion may include a time stamp indicating a time on which the first data portion has been generated.

According to various embodiments, the first data portion may be reproduced based on the timestamp of the first data portion.

According to various embodiments, the first data portion may include or may be at least one of audio data and image data and video data and text data.

According to various embodiments, the second data portion may include or may be at least one of audio data and image data and video data and text data.

According to various embodiments, the first data portion may include or may be video data, and the second data portion may include or may be audio data related to the video data.

According to various embodiments, the second data portion may include or may be image data of video data, and the first data portion may include or may be audio data of the video data.

According to various embodiments, at least one further data portion (for example a third data portion) may be provided, and synchronization may be provided between the first data portion, the second data portion, and the third data portion. For example, the third data portion may include subtitle information related to the audio data of the second data portion, or may include another audio data, for example in a different language.

Figure 5:
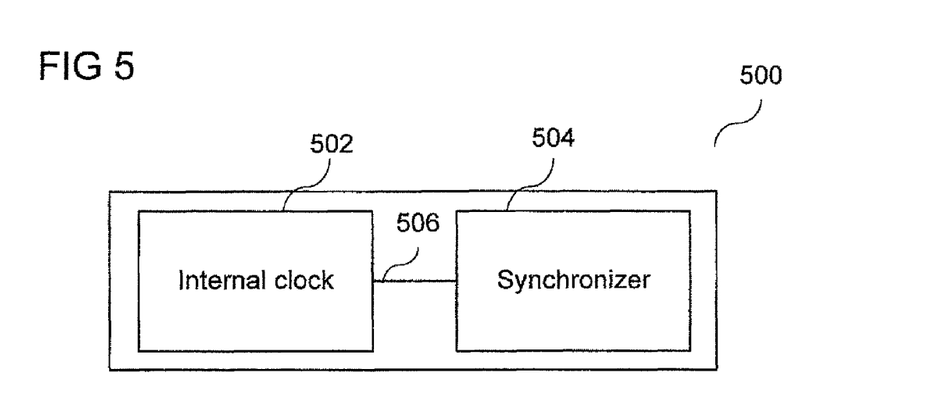
FIG. 5 shows a communication device in accordance with an embodiment.

FIG. 5 shows a communication device 500 in accordance with an embodiment. The communication device 500 may include an internal clock 502. The communication device 500 may further include a synchronizer 504 configured to synchronize the internal clock 502 of the communication device 500 with an internal clock of a further communication device (not shown) in a collaborative communications session with the communication device 500, based on information interchanged with the further communication device. The internal clock 502 and the synchronizer 504 may be coupled with each other, e.g. via an electrical connection 506 such as e.g. a cable or a computer bus or via any other suitable electrical connection to exchange electrical signals.

Figure 6:
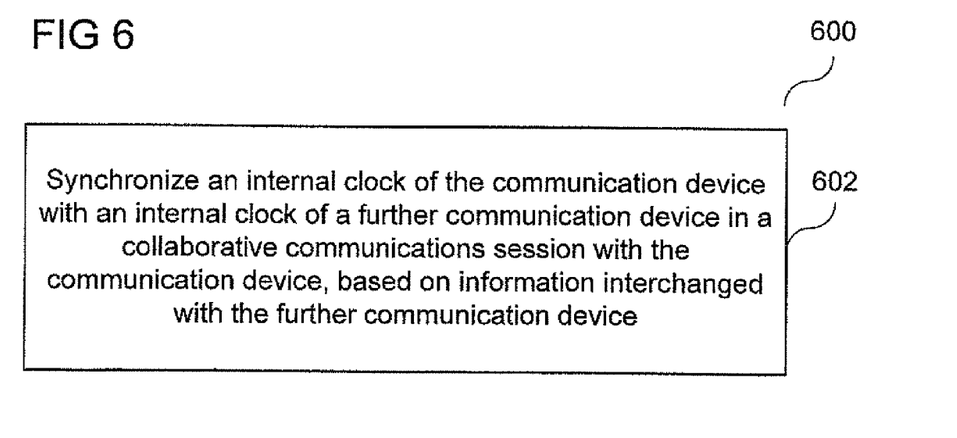
FIG. 6 shows a flow diagram illustrating a method for controlling a communication device in accordance with an embodiment.

FIG. 6 shows a flow diagram 600 illustrating a method for controlling a communication device in accordance with an embodiment. In 602, an internal clock of the communication device may be synchronized with an internal clock of a further communication device in a collaborative communications session with the communication device, based on information interchanged with the further communication device.

According to various embodiments, time stamps indicating the same time instance for media generated at the same time may be included in multimedia streams and information may be exchanged between the presentation devices, for example communication devices like described above, about their internal timing via a symmetrical connection. From the exchanged information and the send times and receive times of the exchanged information, a timing offset between both devices may be determined. From the determined timing offset and the time stamps included in the media, delay times may be calculated. Media may be delayed according to the calculated delay times.

According to various embodiments, the symmetrical connection may be a wireless Bluetooth connection. For Bluetooth pairing of the presentation devices (for example one of the communication devices described above), pairing codes may be used which may be derived from the call ID of the multimedia session. Thereby pairing may be performed automatically without any human assistance.

According to various embodiments, the symmetrical connection may be a generic IP (Internet protocol) connection using strict source routing to ensure symmetry.

According to various embodiments, the symmetrical connection may be a local breakout connection. For example in a home environment using a Home NodeB (which may for example also be understood as a local home base station), the symmetrical connection may be a connection directly relayed by the Home NodeB.

According to various embodiments, synchronization may be performed repetitively after pre-determined time periods. For example, a pre-determined time period may be a long time period.

According to various embodiments, the time stamps included in the multimedia streams may be digital time stamps (for example NTP time stamps) or analog time stamps (for example pseudo random noise sequences added to the media data).

According to various embodiments, time stamps may be included in the media by media sources or by media distributing servers.

According to various embodiments, devices and methods may be provided that may be used in 3GPP collaborative sessions.

According to various embodiments, devices and methods may be provided that allow to synchronize media presented by different presentation devices without human assistance.

According to various embodiments, devices and methods may provide media synchronization that may be more accurate than synchronization using commonly used server based NTP time synchronization.

Figure 7:
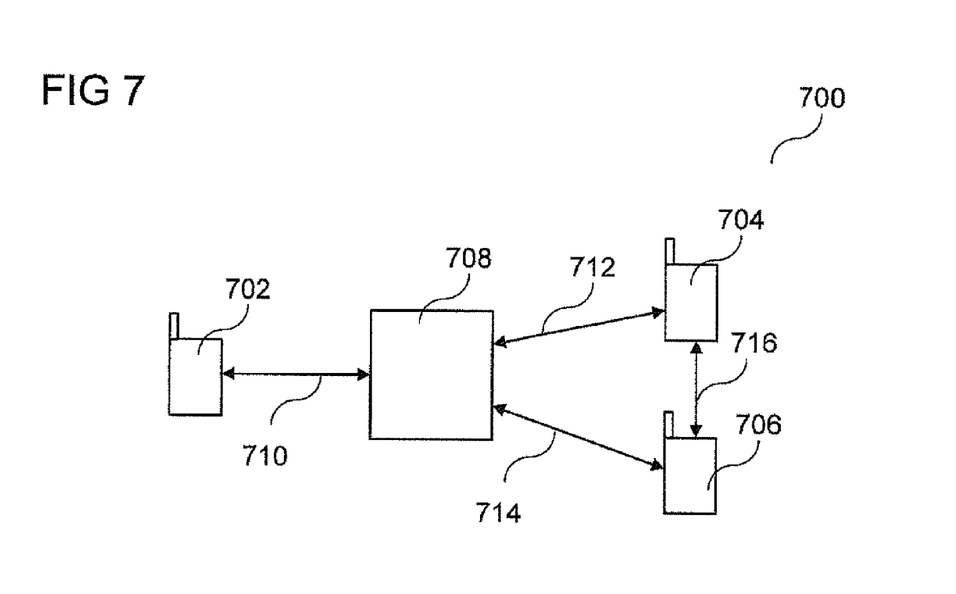
FIG. 7 shows various communication devices in accordance with an embodiment.

FIG. 7 shows various communication devices 700 in accordance with an embodiment. For example, a video call may be considered. A video call service may be provided by an application server AS 708, for example using the IP Multimedia Subsystem (IMS). Video call end devices (for example communication devices) may be connected to each other via the application server 708. For example a first communication device 702 (which may also be referred to as T1, and which may be a corresponding communication device like described above), a second communication device 704 (which may also be referred to as T2, and which may be a communication device 200 like shown in FIG. 2 or a communication device 300 like shown in FIG. 3), and a third communication device (which may also be referred to as T3, and which may be a further communication device like described above) may be provided.

For example, the first communication device 702 may belong to a first user (which may also be referred to as U1). For example, the second communication device 704 and the third communication device 706 may belong to a second user (which may also be referred to as U2).

The first user U1 may call the second user U2 using his mobile phone (in other words: using the first communication device T1 (702)). The first communication device T1 (702) may send a SIP (Session Initiation Protocol) INVITE request to the application server 708 including a call ID for the call, like indicated by a first arrow 710. The application server 708 may forward the request to the second user's mobile phone (in other words: to the second communication device T2 (704)), like indicated by second arrow 712. The second user U2 may accept the call with his device T2 (704).

For example, it may be assumed that the second communication device T2 (704) may not be able to process video (or it may not be desired that the second communication device T2 (704) processes video). Furthermore, it may assumed that therefore, the second user U2 may transfer the video media to his nearby friend's smart phone T3 (in other words: to the third communication device 706; it may be assumed that thereby, the third communication device 706 is made a communication device of the second user U2). By transferring the media, the second user U2 may automatically set up a collaborative session including the second communication device T2 (704) and the third communication device T3 (706). For example, the second communication device T2 (704) may become the controller of the collaborative session. The application server 708 may send the video data to the third communication device T3 (706), like indicated by a third arrow 714.

According to various embodiments, the devices of the collaborative session, for example the second communication device T2 (704) and the third communication device T3 (706), may connect to each other, for example via Bluetooth, like indicated by a fourth arrow 716. According to various embodiments, the connection may be set up by using a pairing code derived from the call ID received from the application server 708 in the SIP INVITE request. For example the tail characters of the call ID may be used as pairing code. In order to avoid pairing code collisions, maximum length pairing codes may be used.

Figure 8:
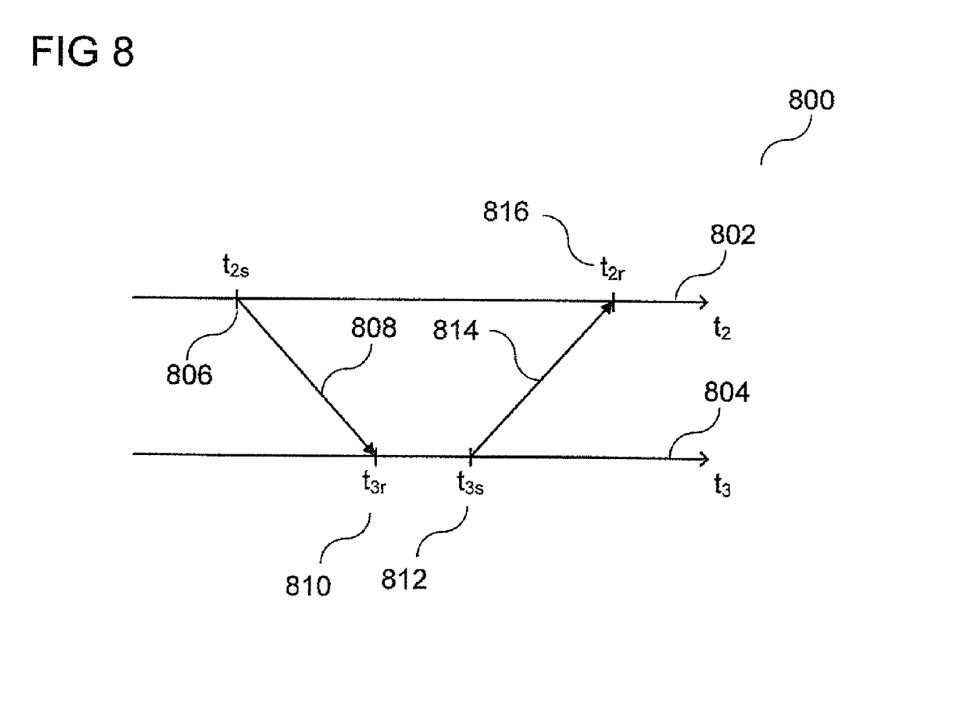
FIG. 8 shows a flow diagram illustrating a method for controlling a communication device in accordance with an embodiment.

FIG. 8 shows a flow diagram 800 illustrating a method for controlling a communication device in accordance with an embodiment. A first time axis 802 shows the time $t_2$ according to an internal clock of the second communication device T2 (704). A second time axis 804 shows the time $t_3$ according to an internal clock of the third communication device T3 (706). In the illustration 800 of a timing for internal clock timing offset measurement, $t_2$ may be an internal clock time of the second communication device, and $t_3$ may be an internal clock time of the third communication device; $t_{2s}$ may be a send time of the second communication device, and $t_{3s}$ may be a send time of the third communication device; $t_{2r}$ may be a receive time of the second communication device, and $t_{3r}$ may be a receive time of the third communication device.

After establishment of the connection with the third communication device 706, for example via the Bluetooth connection, the second communication device 704 may send its current internal time $t_{2s}$ (806) to the third communication device 706 via the connection, like indicated by a first transmission arrow 808. After having received the message, the third communication device 706 may send back its internal receive time $t_{3r}$ (810) and its current internal send time $t_{3s}$ (812) to the second communication device 704, like indicated by a second transmission arrow 814. After reception, the second communication device 704 may send its internal receive time $t_{2r}$ (816) to the third communication device 706. From the send and receive times, the second communication device 704 and the third communication device 706 may calculate a timing offset delta t between the two communication devices' internal clocks according to the formula:

$$\text{delta } t = [t_{2r} + t_{2s} - (t_{3s} + t_{3r})]/2,$$

in accordance with the timing shown in FIG. 8.

Figure 9:
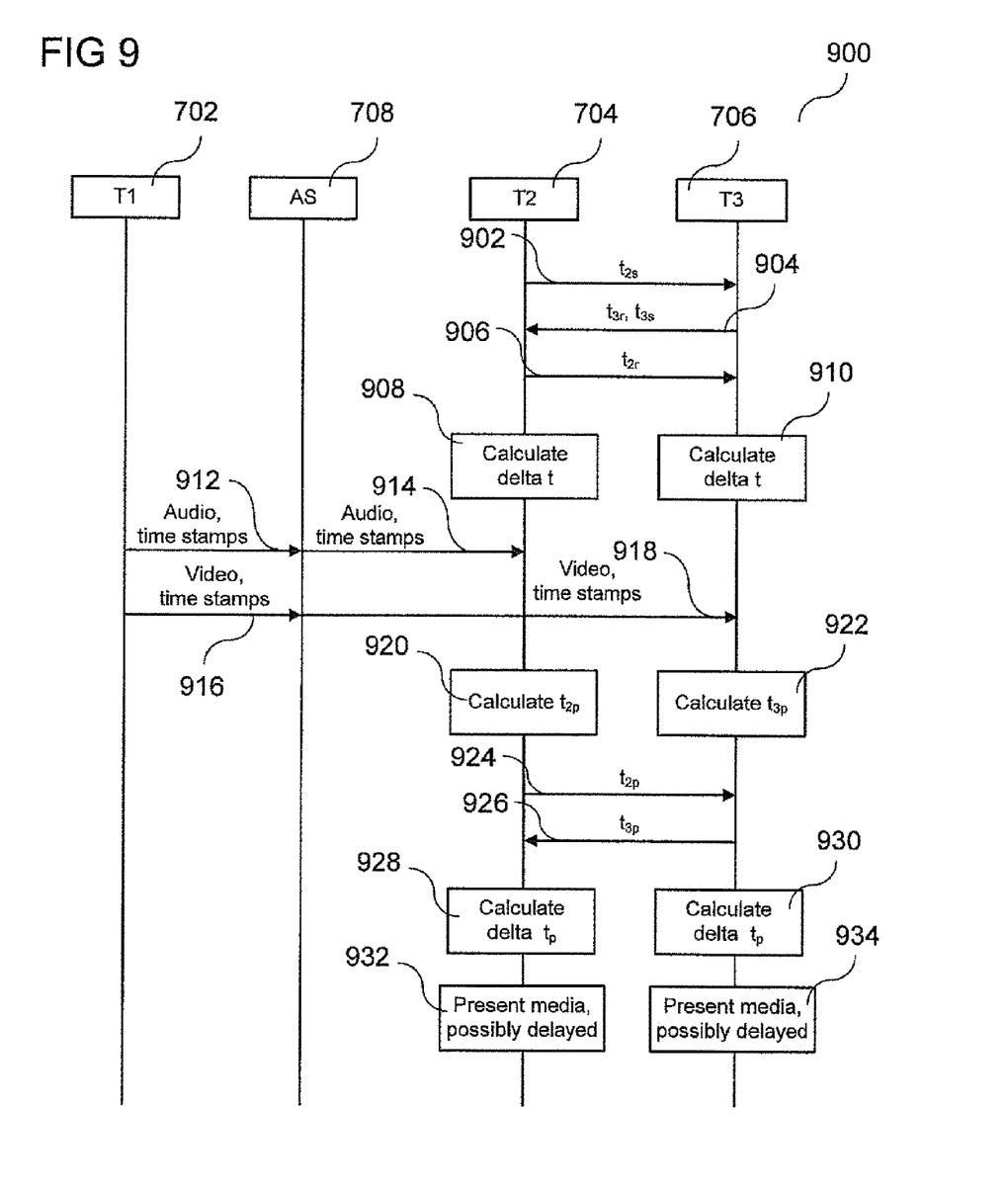
FIG. 9 shows a flow diagram illustrating a method for controlling a communication device in accordance with an embodiment.

FIG. 9 shows a flow diagram 900 illustrating a method for controlling a communication device in accordance with an embodiment. Dataflow, for example signaling flow for lip synchronization, between the first communication device T1 (702), the application server 708, which may also be referred to as AS, the second communication device T2 (704) and the third communication device T3 (706) is shown. Like described above, after establishment of the connection with the third communication device 706, for example the Bluetooth connection, the second communication device 704 may, in 902, send its current internal time $t_{2s}$ (806) to the third communication device 706 via the connection. After having received the message, the third communication device 706 may, in 904, send back its internal receive time $t_{3r}$ (810) and its current internal send time $t_{3s}$ (812) to the second communication device 704. After reception, the second communication device 704 may, in 906, send its internal receive time $t_{2r}$ (816) to the third communication device 706. In 908, the second communication device 704 may compute the value of delta t like described above. In 910, the third communication device 706 may compute the value of delta t like described above.

According to various embodiments, the audio and video data (in other words: audio and video media) may be transmitted via the Real-time Transport Protocol (RTP). RTP transmission may be controlled via the RTP Control Protocol (RTCP).

According to various embodiments, when the first communication device T1 (702) sends media via RTP/RTCP, it may include NTP time stamps in the media's RTP and RTCP headers. The time stamps may indicate the time instance at the first communication device 702 when the first media samples included in the RTP/RTCP packets have been captured by the first communication device. For example, the first communication device 702 may send audio data including time stamps to the AS 708 in 912, which may then send the audio data including time stamps to the second communication device 704 in 914. For example, the first communication device 702 may send video data including time stamps to the AS 708 in 916, which may then send the video data including time stamps to the third communication device 706 in 918.

According to various embodiments, after having received their first media packets, the second communication device T2 (704) and the third communication device T3 (706) may determine the time instance when they are able to present the first media samples of the packets. For example, in 920, the second communication device 704 may determine a presentation time $t_{2p}$ of the second communication device 704. For example, in 922, the third communication device 706 may determine a presentation time $t_{3p}$ of the third communication device 706. The determined presentation times $t_{2p}$ and $t_{3p}$ may include the required processing time for decoding the media and may be expressed as internal clock time.

According to various embodiments, the second communication device 704 and the third communication device 706 may then exchange their determined presentation times $t_{2p}$ and $t_{3p}$, for example via the Bluetooth connection. For example, in 924, the second communication device 704 may send its determined presentation time $t_{2p}$. For example, in 926, the third communication device 706 may send its determined presentation time $t_{3p}$.

From the presentation times and the timing offset delta t the devices (for example the second communication device 704 in 928 and the third communication device 706 in 930) may calculate a presentation timing offset delta $t_p$ according to:

$$\text{delta } t_p = \text{delta } t - (t_{2p} - t_{3p}).$$

If the presentation timing offset delta $t_p$ is greater than zero, then the second communication device 704 may delay its media presentation by delta $t_p$. If the presentation timing offset delta $t_p$ is less than zero, then the third communication device 706 may delay its media presentation by $-$delta $t_p$.

In 932, the second communication device 704 may present the media, for example delayed, for example delayed depending on delta $t_p$. In 934, the third communication device 706 may present the media, for example delayed, for example delayed depending on delta $t_p$.

Figure 10:
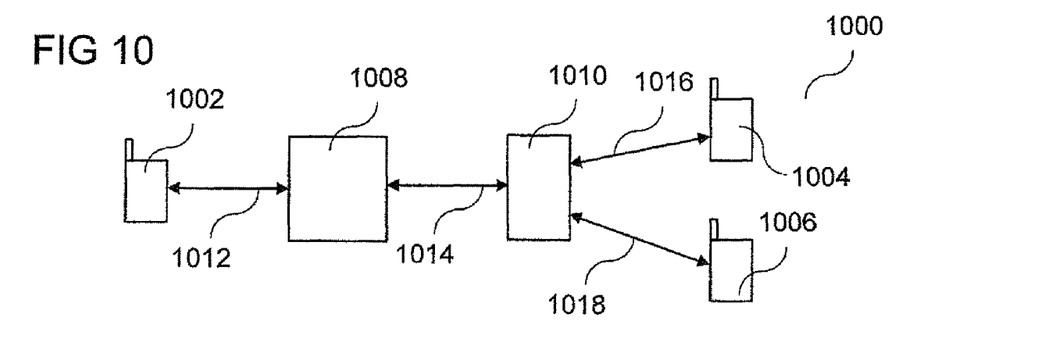
FIG. 10 shows various communication devices in accordance with an embodiment.

FIG. 10 shows an illustration 1000 of various communication devices in accordance with an embodiment. The illustration 1000 shows a system architecture for IMS video call lip synchronization via a Home NodeB 1010.

Like in the example described in FIG. 7, FIG. 8 and FIG. 9, a video call may be considered. The video call service may be provided by an application server AS 1008 using the IP Multimedia Subsystem (IMS). The video call end devices (for example a first communication device 1002 (for example the corresponding communication device described above), a second communication device 1004 (for example the communication device 200 of FIG. 2 or the communication device 300 of FIG. 3) and a third communication device 1006 (for example the further communication device described above)) may be connected to each other via the application server 1008.

A fist user U1 may call a second user U2 using his mobile phone, for example the first communication device T1 (1002). The first communication device T1 (1002) may send a SIP (Session Initiation Protocol) INVITE request to the application server AS 1008 including a call ID for the call, like indicated by a first arrow 1012. The application server 1008 may forward the request to the second user U2's mobile phone, for example the second communication device T2 (1004). The second user U2 may accept the call with his device, for example the second communication device T2 (1004).

The second communication device 1004 may be connected to the application server 1008 via the Home NodeB 1010 of the second user, like indicated by a second arrow 1014 and a third arrow 1016. Furthermore, the third communication device 1006, for example a TV (television) set top box T3 of the second user, may be connected to the IMS 1008 via the Home NodeB 1010, like indicated by the second arrow 1014 and a fourth arrow 1018.

For example, the second user U2 may like to watch the video media on his TV screen. The second user U2 may transfer the video media to the third communication device 1006, for example set top box T3. By transferring the media, the second user U2 may automatically set up a collaborative session including the second communication device T2 (1004) and the third communication device T3 (1006). The second communication device T2 (1004) may become the controller of the collaborative session.

According to various embodiments, the devices of the collaborative session, for example the second communication device T2 (1004) and the third communication device T3 (1006), may connect to each other directly via the Home NodeB 1010 (for example since the set top box does not provide Bluetooth connectivity). Like the Bluetooth connection in the example described above, the direct Home NodeB connection may be used to determine a timing offset delta t between an internal clock of the second communication device 1004 and an internal clock of the third communication device 1006.

According to various embodiments, the SIP call ID may be used to derive a Bluetooth pairing code. According to various embodiments, the pairing code may be derived from the CNAME identifier of source description RTCP packets.

According to various embodiments, presentation times may be exchanged via Bluetooth or a Home NodeB. According to various embodiments, presentation times may be exchanged via network provided connections (for example the connection that is used for exchanging data in the collaborative communications session) even if Bluetooth or a Home NodeB is used for internal clock timing offset measurements.

Figure 11:
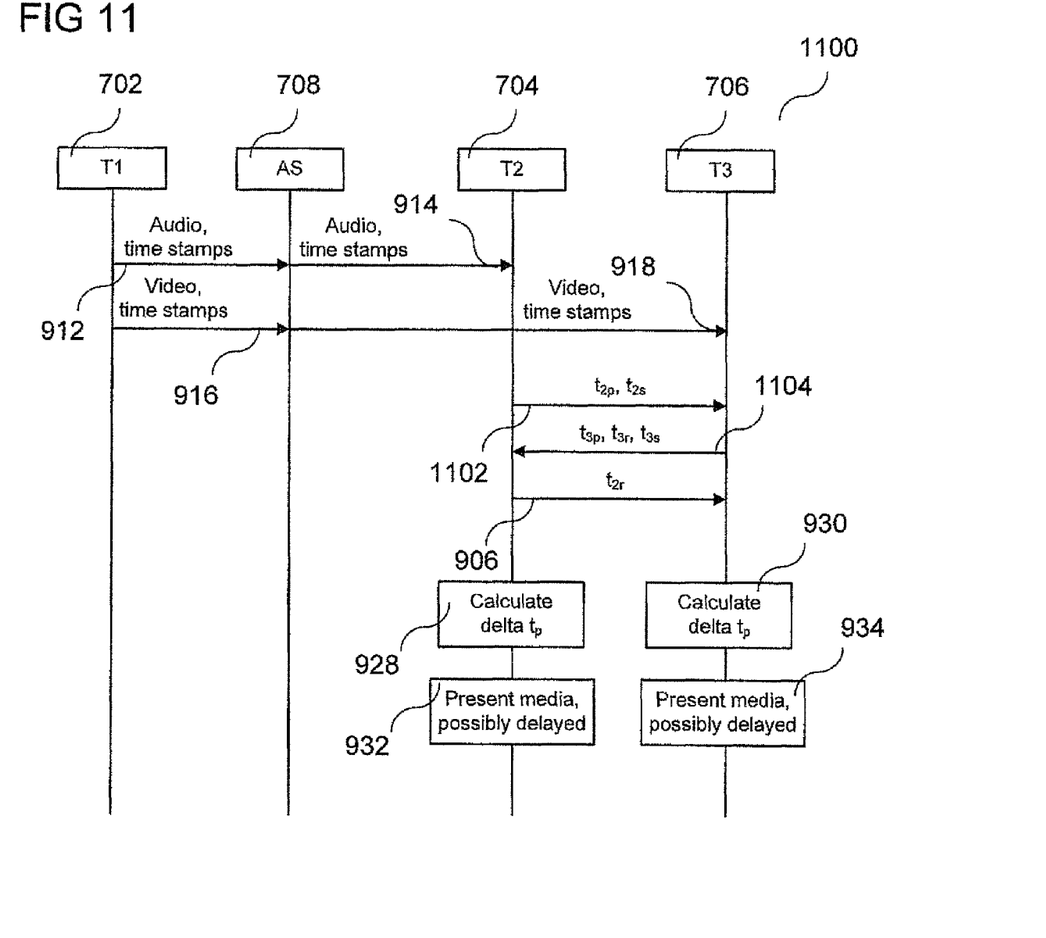
FIG. 11 shows a flow diagram illustrating a method for controlling a communication device in accordance with an embodiment.

According to various embodiments, measured send and receive times and presentation times may be sent in combined messages together. In this case, the internal clock timing offset measurement may be done after having received RTP/RTCP packets. FIG. 11 shows the corresponding data flow.

FIG. 11 shows a flow diagram 1100 illustrating a method for controlling a communication device in accordance with an embodiment. Information may be interchanged as shown in the signaling flow 1100 for lip synchronization with alternative timing, wherein various messages may be similar or identical to messages described above with reference to FIG. 9, for which the same reference signs may be used and duplicate description may be omitted. In 1102, the presentation time and the send time of the second communication device 704 may be sent (in other words: in 1102, the information of transmissions 902 and 924 of FIG. 9 may be transmitted combined). In 1104, the presentation time, the receive time, and the send time of the third communication device 706 may be sent (in other words: in 1104, the information of transmissions 904 and 926 of FIG. 9 may be transmitted combined).

According to various embodiments, internal clock timing offsets may be measured using generic IP connections with strict source routing to ensure symmetrical connections; for example connections may be used that are using the same path in both transmission directions.

According to various embodiments, synchronization may be performed repetitively after pre-determined (for example after long) time periods.

According to various embodiments, digital time stamps (like NTP time stamps in RTP/RTCP packets) may be used. According to various embodiments, the time stamps included in the multimedia streams may be analog time stamps (for example pseudo random noise sequences added to the media data).

According to various embodiments, time stamps may be included in the media by media distributing servers or by the media source.

Devices and methods according to various embodiments may be used in other communication systems than IMS based systems. For example, the devices and methods according to various embodiments may be used without using IMS collaborative sessions.

According to various embodiments, the devices and methods according to various embodiments may be used with other protocols than SIP and/or RTP/RTCP.

According to various embodiments, the devices and methods according to various embodiments may be used for synchronizing more than two media.

According to various embodiments, the use of the synchronization method according to various embodiments may be negotiated at call setup.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a first communication interface configured to receive a first data portion from a corresponding communication device;
   a second communication interface configured to receive data from a further communication device, wherein the further communication device receives a second data portion from the corresponding communication device, wherein the first data portion and the second data portion are useful data for a user of the communication device;
   a synchronizer configured to synchronize the first data portion with the second data portion based on the data received from the other communication device via the second communication interface;
   a data reproducer configured to reproduce the first data portion;
   wherein the second communication interface is further configured to receive from the further communication device a second presenting time information comprising information indicating a time when the further communication device may reproduce the second data portion;
   wherein the communication device is further configured to determine a pre-determined amount of delay based on the synchronization of the first data portion with the second data portion; and
   wherein the communication device is further configured to delay the reproduction of the first data portion by the pre-determined amount of delay.

2. The communication device of claim 1, wherein the second communication interface is configured for a symmetric communication with the further communication device.

3. The communication device of claim 1, further comprising:
   an internal clock.

4. The communication device of claim 3, wherein the second communication interface is configured to send first timing information comprising a send time of the first timing information according to the internal clock of the communication device to the further communication device.

5. The communication device of claim 3, wherein the second communication interface is further configured to receive a second timing information comprising a send time of the second timing information according to an internal clock of the further communication device from the further communication device.

6. The communication device of claim 1, wherein the second communication interface is further configured to send to the further communication device a first presenting time information comprising information indicating a time when the communication device may reproduce the first data portion.

7. The communication device of claim 6, wherein the first presenting time is based on a reception time of the first data portion.

8. The communication device of claim 3, wherein the synchronizer is further configured to synchronize the internal clock of the communication device with an internal clock of the further communication device.

9. The communication device of claim 1, wherein the first data portion comprises a time stamp indicating a time on which the first data portion has been generated.

10. The communication device of claim 1, wherein the first data portion comprises at least one of audio data and image data and video data and text data.

11. A method for controlling a communication device, the method comprising:
    receiving a first data portion from a corresponding communication device;
    receiving data from a further communication device, wherein the further communication device receives a second data portion from the corresponding communication device, wherein the first data portion and the second data portion are useful data for a user of the communication device;
    synchronizing the first data portion with the second data portion based on the data received from the other communication device via the second communication interface;
    reproducing the first data portion;
    receiving from the further communication device a second presenting time information comprising information indicating a time when the further communication device may reproduce the second data portion;
    determining a pre-determined amount of delay based on the synchronization of the first data portion with the second data portion; and
    delaying the reproduction of the first data portion by the pre-determined amount of delay.

12. The method of claim 11, wherein the data is received from the further communication device via a symmetric connection from the further communication device.

13. The method of claim 11, further comprising:
    determining a time according to an internal clock.

14. The method of claim 13, further comprising:
sending first timing information comprising a send time of the first timing information according to the internal clock of the communication device to the further communication device.

15. The method of claim 13, further comprising:
receiving a second timing information comprising a send time of the second timing information according to an internal clock of the further communication device from the further communication device.

16. The method of claim 11, further comprising:
sending to the further communication device a first presenting time information comprising information indicating a time when the communication device may reproduce the first data portion.

17. The method of claim 16,
wherein the first presenting time is based on a reception time of the first data portion.

18. The method of claim 13, further comprising:
synchronizing the internal clock of the communication device with an internal clock of the further communication device.

19. The method of claim 11,
wherein the first data portion comprises a time stamp indicating a time on which the first data portion has been generated.

20. The method of claim 11, further comprising:
reproducing the first data portion based on the timestamp of the first data portion.

21. The method of claim 11,
wherein the first data portion comprises at least one of audio data and image data and video data and text data.

* * * * *